United States Patent [19]

Murakami

[11] Patent Number: 5,729,782
[45] Date of Patent: Mar. 17, 1998

[54] CAMERA FILM FEED DRIVE SYSTEM REDUCING VIBRATION AND NOISE

[75] Inventor: Hiroshi Murakami, Utsunomiya, Japan

[73] Assignee: Nikon Corporation, Tokyo, Japan

[21] Appl. No.: 524,178

[22] Filed: Sep. 6, 1995

[30] Foreign Application Priority Data

Nov. 2, 1994 [JP] Japan .................................. 6-269643

[51] Int. Cl.$^6$ .................................................. G03B 1/18
[52] U.S. Cl. .......................................................... 396/418
[58] Field of Search ........................... 354/173.1, 173.11, 354/212, 214; 352/35; 396/387, 395–400, 411, 418, 535

[56] References Cited

U.S. PATENT DOCUMENTS

| | | |
|---|---|---|
| 2,196,358 | 4/1940 | Heinisch . |
| 4,013,352 | 3/1977 | Monroy . |
| 4,121,886 | 10/1978 | Gottschalk . |
| 4,174,157 | 11/1979 | Gottschalk . |
| 4,536,066 | 8/1985 | Bauer . |
| 5,237,352 | 8/1993 | Grosser et al. . |
| 5,479,231 | 12/1995 | Tanaka ........................... 354/173.1 |

FOREIGN PATENT DOCUMENTS

4-346327 of 1992 Japan .
4-371932 of 1992 Japan .
7-28141 of 1995 Japan .

*Primary Examiner*—Howard B. Blankenship

[57] ABSTRACT

A camera film feed drive system has reduced vibration and noise during winding and rewinding of photographic film. The camera film feed drive system includes a camera body, film drive motor, film winding spool, and a plurality of noise absorbers. The camera body provides structural support and the film drive motor winds and rewinds the photographic film. The film winding spool rotates in response to the film drive motor and directly contacts the photographic film. A reduction drive unit is connected between the film drive motor and the camera body. A plurality of rotatable gears are operatively connected to the film drive motor and are supported by the reduction drive unit. The camera film feed drive system particularly includes a first noise absorber disposed between the reduction drive unit and the camera body and a plurality of second noise absorbers, respectively disposed about a plurality of corresponding threaded fasteners for reducing vibration and noise during winding and rewinding of the photographic film. The first noise absorber is a circular member which mates between a circumferential bead in a chamber of the camera body and the reduction drive unit. Each of the second noise absorbers is a cylinder having a top end peripheral bead and a bottom end peripheral bead for being received within a pair of axial bores within the reduction drive unit.

21 Claims, 10 Drawing Sheets

CAMERA FILM FEED DRIVE SYSTEM REDUCING VIBRATION AND NOISE

BACKGROUND OF THE INVENTION

1. Field of the Invention

The present invention relates to a camera that is equipped with a film feeding system driven by an electric motor. More particularly, the present invention relates to a camera that is designed with a noise reducing and vibration reducing film feeding system.

2. Description of the Related Art

Many examples of conventional camera film feeding systems use a motor as a driving source for feeding camera film. Specifically, such film feed drive mechanisms generally consist of a film winding spool for receiving photographic film, a motor for film feeding, and a gear train for transmitting a rotary drive force between the winding spool and motor. The gear train transmits motor rotation to the film winding spool through a plurality of gears to thereby advance the film. In conventional cameras, this drive mechanism for the film feeding system is directly secured to the camera by a camera structural member.

Figure 1:
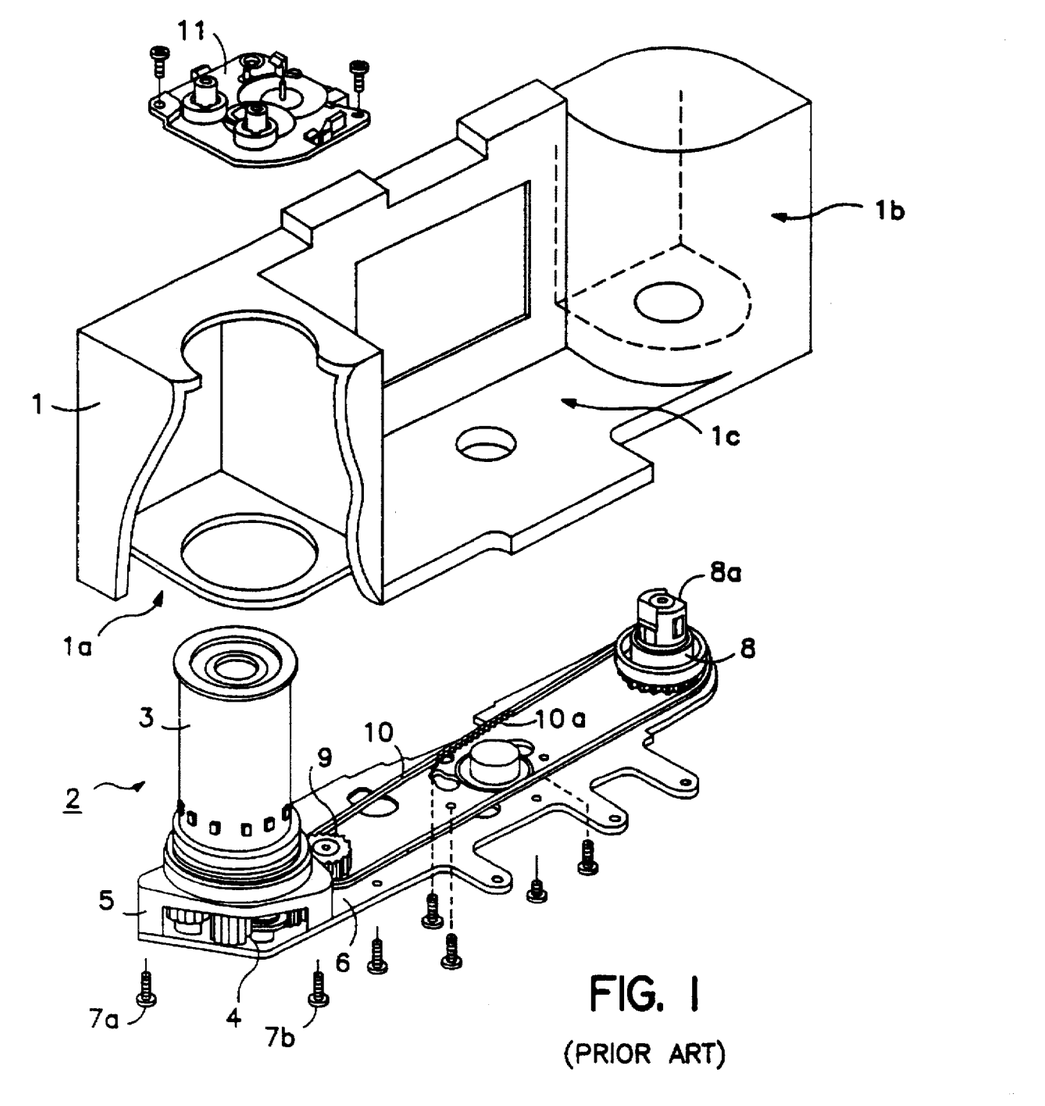
FIG. 1 (PRIOR ART) is a schematic perspective view illustrating a configuration of a conventional camera.

FIG. 1 (prior art) is an elevated perspective view illustrating an outline of a film feed drive mechanism and a motor in a conventional camera. In the same figure, camera body 1 is the camera's structural member. Camera body 1 consists of film winding spool chamber 1a, film magazine formation section 1b, and dark box formation section 1c having an aperture section. Film feed drive mechanism 2 is equipped with film winding spool 3 in which a motor (not shown) is integrated as a driving source for film feeding. Film winding spool 3 rotates about a central shaft which is not shown. Reduction unit 5 is positioned below film winding spool and includes reduction gear train 4 that reduces and transmits a rotational driving force of the aforementioned motor to a front row of spool 3. Reduction unit 5 is positioned on rewinding baseplate 6 which is arranged beneath camera body 1 and fastened thereto by screws 7a and 7b.

Moreover, a planetary gear mechanism (not shown) is arranged on the aforementioned reduction unit 5. By changing the polarity of the aforementioned motor, the direction of gear train 4 initially driven towards spool 3 can be reversed thereby rewinding spool 3. Subsequently, drive gear 9 of rewinding pulley 8, which is supported by a bearing on rewinding base plate 6 so that it can be rotated, transmits a driving force to drive rewinding pulley 8. Drive rewinding pulley 8 itself is supported by a bearing on rewinding base plate 6 so that it can be rotated by way of belt 10.

Rewinding base plate 6 is positioned under camera body 1 and fastened by a plurality of screws. Furthermore, fork section 8a is provided on rewinding pulley 8 to execute a rewinding operation of a film magazine (not shown). Furthermore, on the upper end of spool 3, raised base plate 11 is positioned and fastened by several screws to camera body 1. Raised base plate 11 supports an upper part of the shaft of spool 3 so that it is rotatable. Consequently, the shaft of spool 3 is positioned and supported at the top and bottom thereof.

With the film feed drive mechanism in the conventional camera using a configuration as outlined above, a number of problems occur. In this type of film feed drive mechanism, a drive section (including the motor and reduction gear train 4, etc.) is directly secured to camera body 1. Camera body 1 is a structural member of the camera and is attached to the drive section with screws 7a and 7b, etc. Thereby, the vibration and noise that occur in the drive section are easily transmitted to camera body 1. Subsequently, there is a possibility that unpleasant noises are amplified and transmitted out of the camera.

In order to reduce the transmission of such noises, it has previously been considered to secure the feed drive section of the camera to camera body 1 with screws and through the application of vibration absorbing material. However, if the entire feed drive section is floated by the vibration absorbing material when using this type of configuration, the floated area itself is increased in size thereby transmitting vibration within the floated area.

Additionally, the system in the floated area has a tendency to move due to the occurrence of vibration, thereby adversely affecting the feeding of the film. Particularly, vibration is likely to occur in the above noted film feed drive system in the motor and the high speed rotation section near the motor in reduction gear train 4. It is therefore desirable to contemplate these aspects and to consider some measures that can eliminate the aforementioned noise and vibration problems.

SUMMARY OF THE INVENTION

It is an object of the present invention to provide a camera that can demonstrate both noise dampening and vibration proofing capabilities.

It is a further object of the invention to provide a camera with a floated area underneath a camera feed drive wherein both noise and vibration are minimized.

It is a further object of the present invention to provide a camera having a simple configuration and a minimal camera motor reduction unit which can be separated from a camera with the use of vibration and noise absorbers to provide a floating support.

It is a further object of the present invention to provide a camera having a motor reduction unit that avoids resonance within the reduction unit and reduces the amount of vibration and noise absorbing materials.

It is a further object of the invention to provide a camera that secures a camera feed drive to a camera body by way of vibration and noise absorbers, as well as to control the transmission of vibration to the camera body.

It is another object of the present invention to secure a camera drive unit having a film winding spool, a film feeding motor, and a transmission system (for transmitting a rotational driving force to the film winding spool) onto a camera body with the application of vibration and noise absorbers. Moreover, it is an object to provide vibration and noise proofing in a small area surrounding a camera vibration source.

It is yet another object of the present invention to provide a camera with first vibration and noise absorption materials that connect a camera's feed drive to a camera's body and second vibration and noise absorption materials having a different hardness from the first materials to thereby minimize transmission of vibration to the camera body and to minimize vibration of a film winding spool.

Objects of the present invention are achieved by a camera comprising a camera body as a structural member, a drive unit including a rotatable film winding spool for receiving and winding film, an electric motor generating a rotary driving force for powering the drive unit, a transmission gear train connected to the drive unit and the electric motor for transmitting the driving force therebetween, and a first vibration and noise absorber disposed between the structural member and the camera body for absorbing vibration and noise.

Objects of the present invention are also achieved, in particular, by a camera providing a vibration and noise proof function in a small area around a vibration source by installing a reduction unit having a film winding spool, a film feeding motor, and a transmission system that transmits the rotational driving force to the spool but is connected to the camera body by way of vibration and noise absorbers.

Further objects of the present invention are achieved by a camera including a reduction unit having a film winding spool, a film feeding motor, and a transmission system that transmits the rotational force of the motor to the spool and is connected to the camera body by way of a first vibration and noise absorber, with second vibration and noise absorbers provided between the reduction unit and a circumferential opening of the camera body, wherein the hardness of the first vibration and noise absorber used for supporting the drive unit on the camera body differs from the hardness of the second vibration and noise absorbers.

Objects of the present invention are also achieved by providing a camera having a film feed drive system with a drive unit having a film winding spool and a film feeding motor, the drive unit having a transmission system for transmitting a rotational driving force of a motor to a film winding spool which is secured to a camera body as the camera's structural member by way of vibration and noise absorbing materials.

Further objects of the present invention are achieved by providing a camera having a feed drive system for securing photographic film comprising a drive unit having a film winding spool, a film feeding motor, and a drive transmission system for transmitting a rotational driving force of a motor onto a camera body with first vibration and noise absorbing materials. Second vibration and noise absorbing materials are provided between the drive unit and the circumference of an opening of the camera body which is different from that of the first vibration and noise absorbing material.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Reference will now be made in detail to the preferred embodiments of the present invention, examples of which are illustrated in the accompanying drawings, wherein like reference numerals refer to like elements throughout.

FIGS. 2–10 illustrate embodiments of a camera relating to the present invention. In these figures, identical numbers are assigned for sections that are the same or equivalent with the aforementioned FIG. 1 (PRIOR ART). Accordingly a second detailed explanation of the identical sections is omitted.

Figure 2:
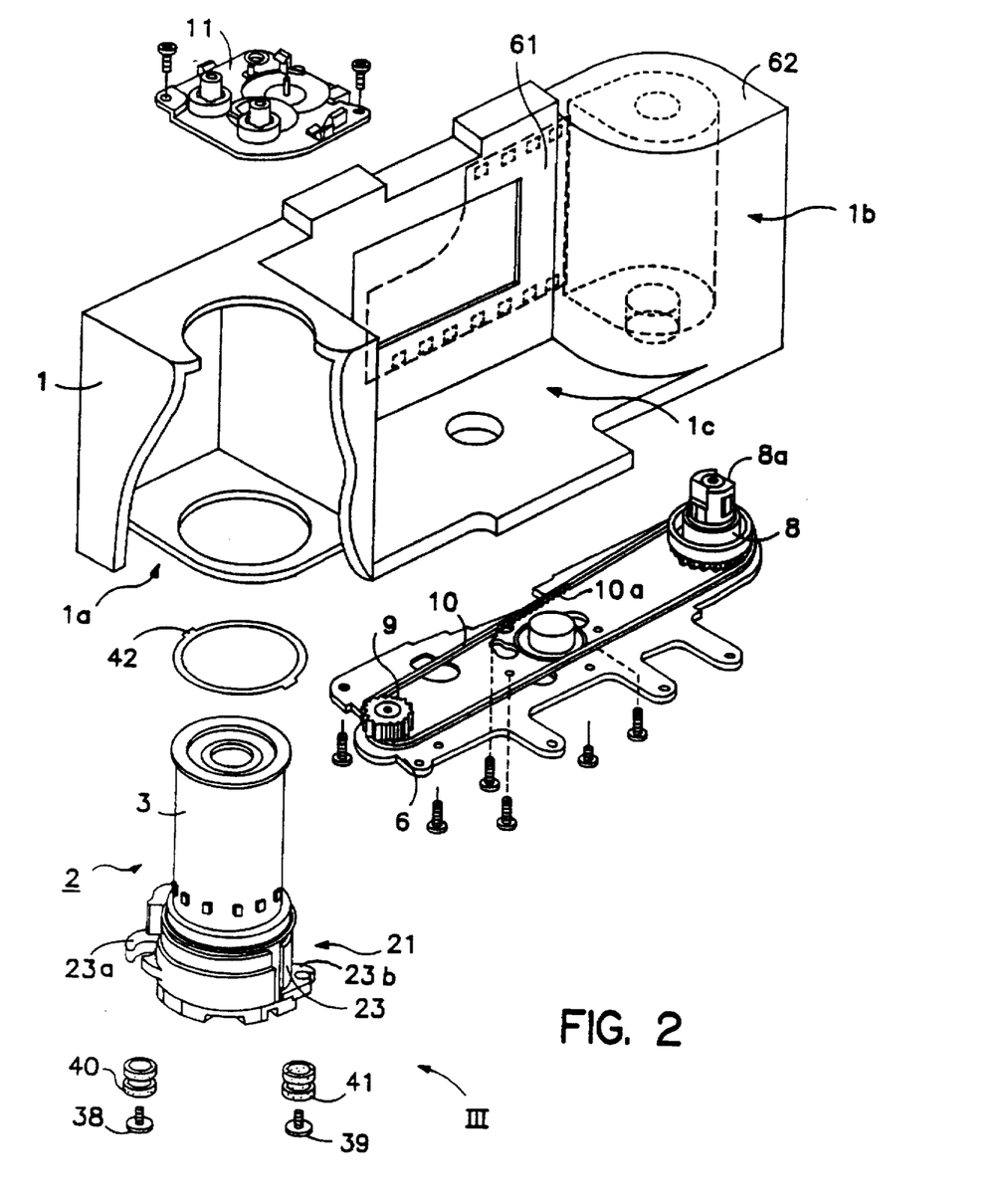
FIG. 2 is a schematic perspective view of an embodiment of a camera according to a preferred embodiment of the present invention illustrating a reduction gear mechanism and a rewinding mechanism of a film feed drive system as well as a supporting section of a film winding spool.
Figure 4:
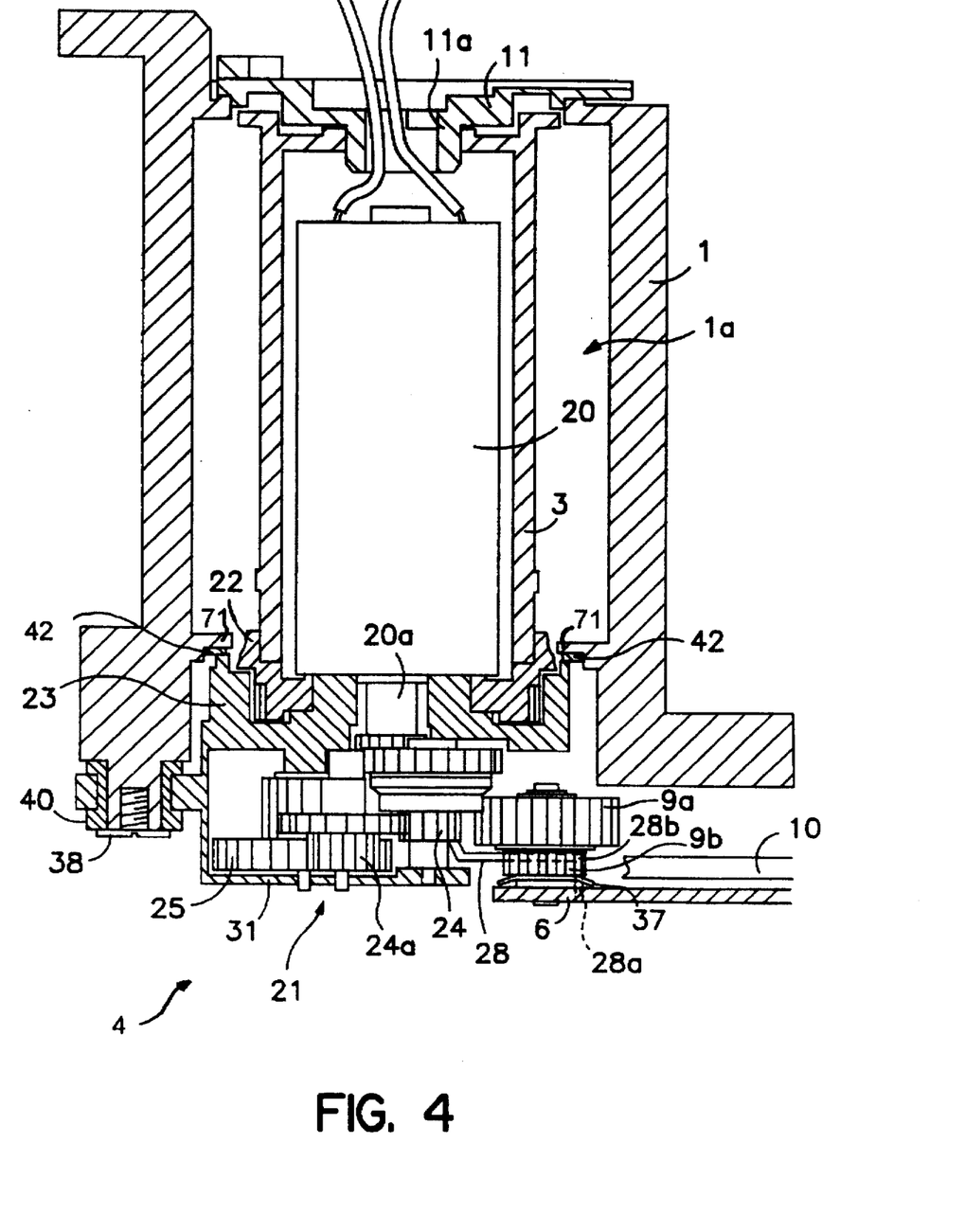
FIG. 4 is a sectional diagram of a film winding spool taken from the direction of arrow IV in FIG. 2.
Figure 5:
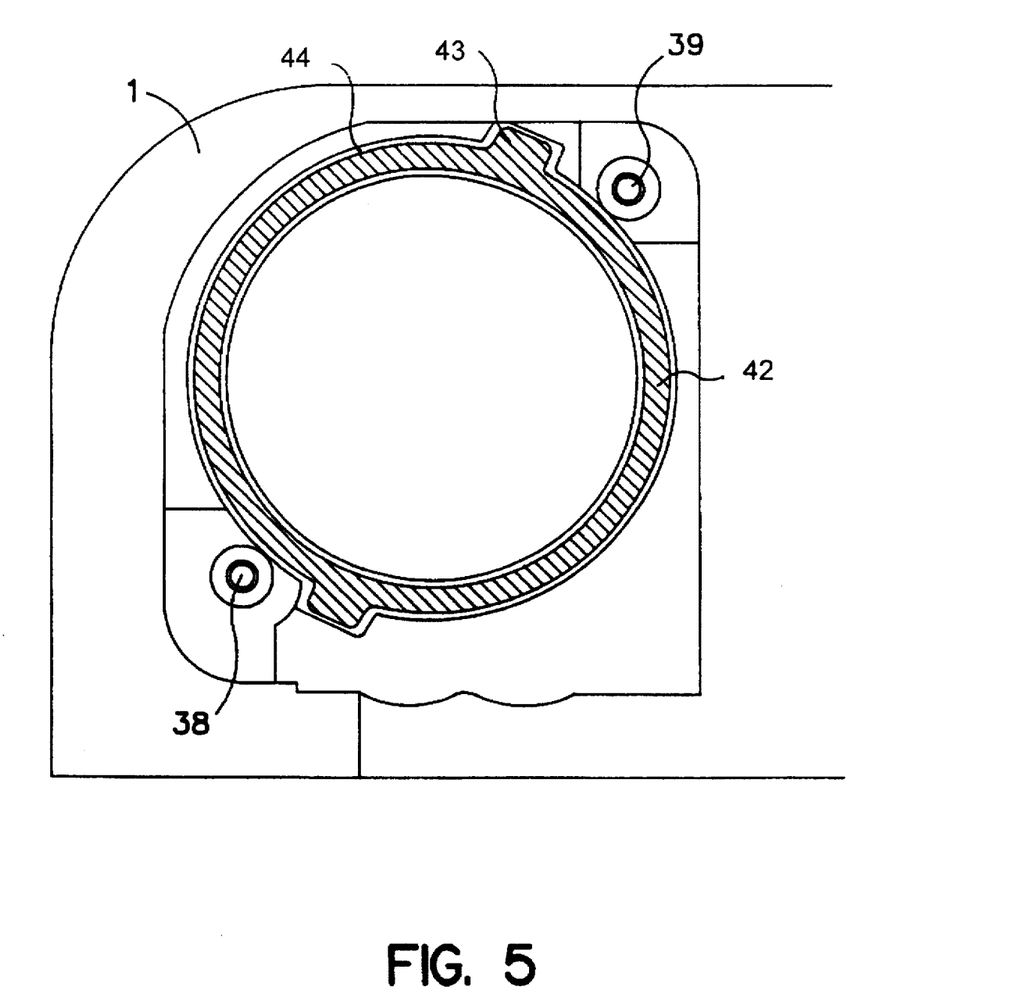
FIG. 5 is a bottom view of a camera body according to a preferred embodiment of the present invention in which vibration and noise absorbers are installed.
Figure 6:
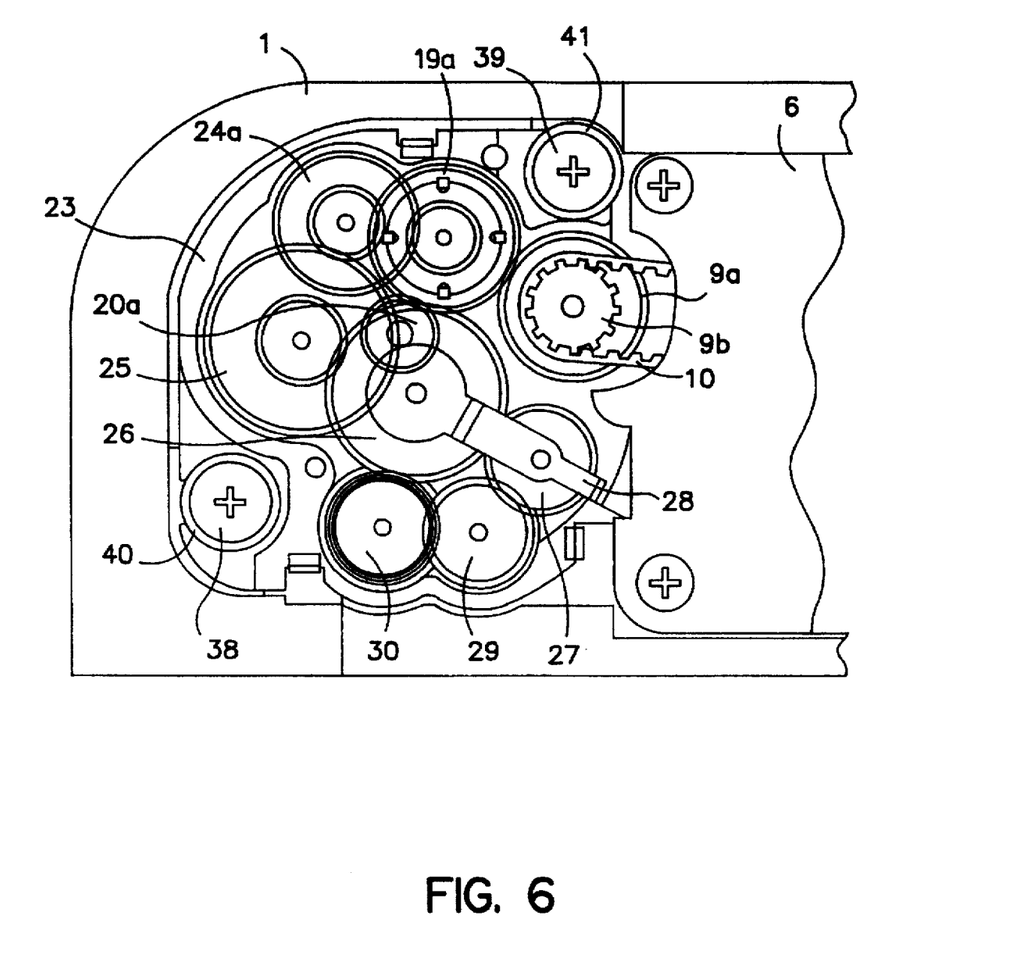
FIG. 6 is a bottom view of a camera body according to FIG. 2 when the film has been wound.
Figure 7:
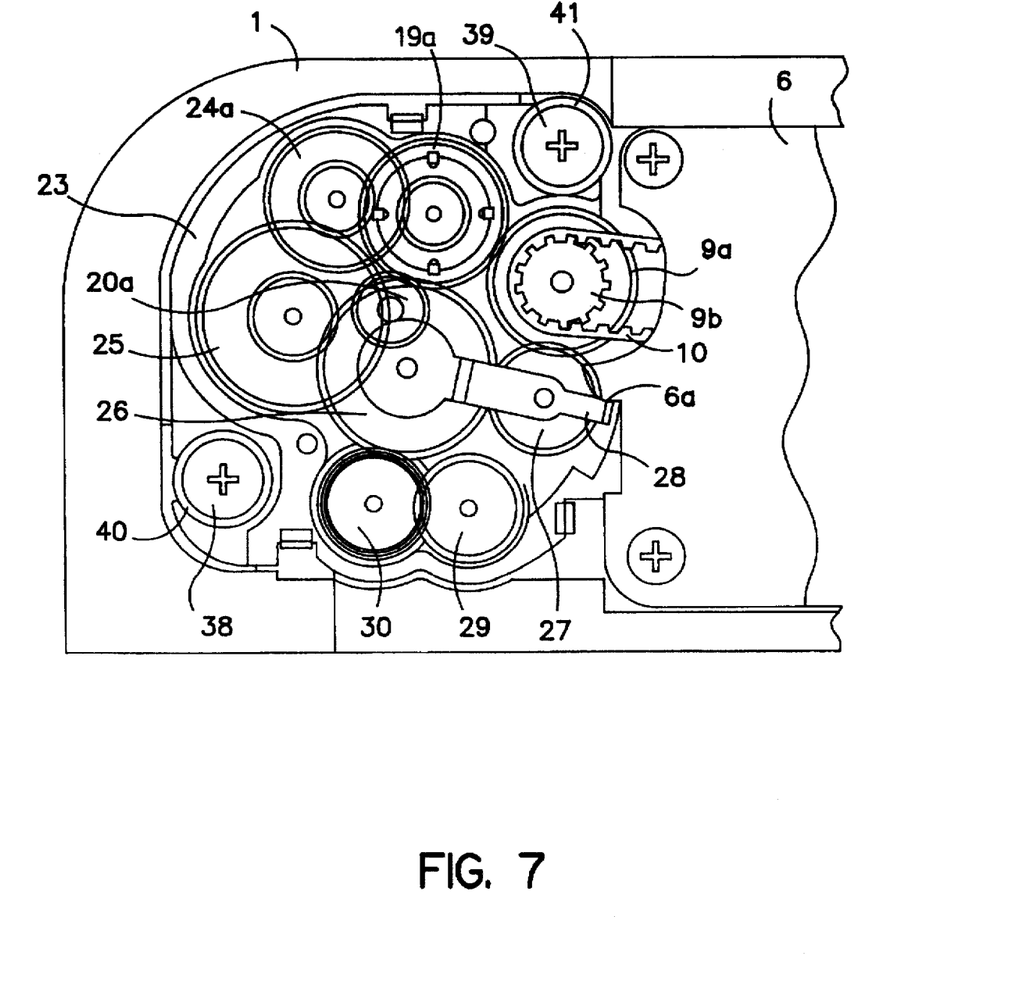
FIG. 7 is a bottom view of a camera body according to FIG. 2 when the film has been rewound.
Figure 8:
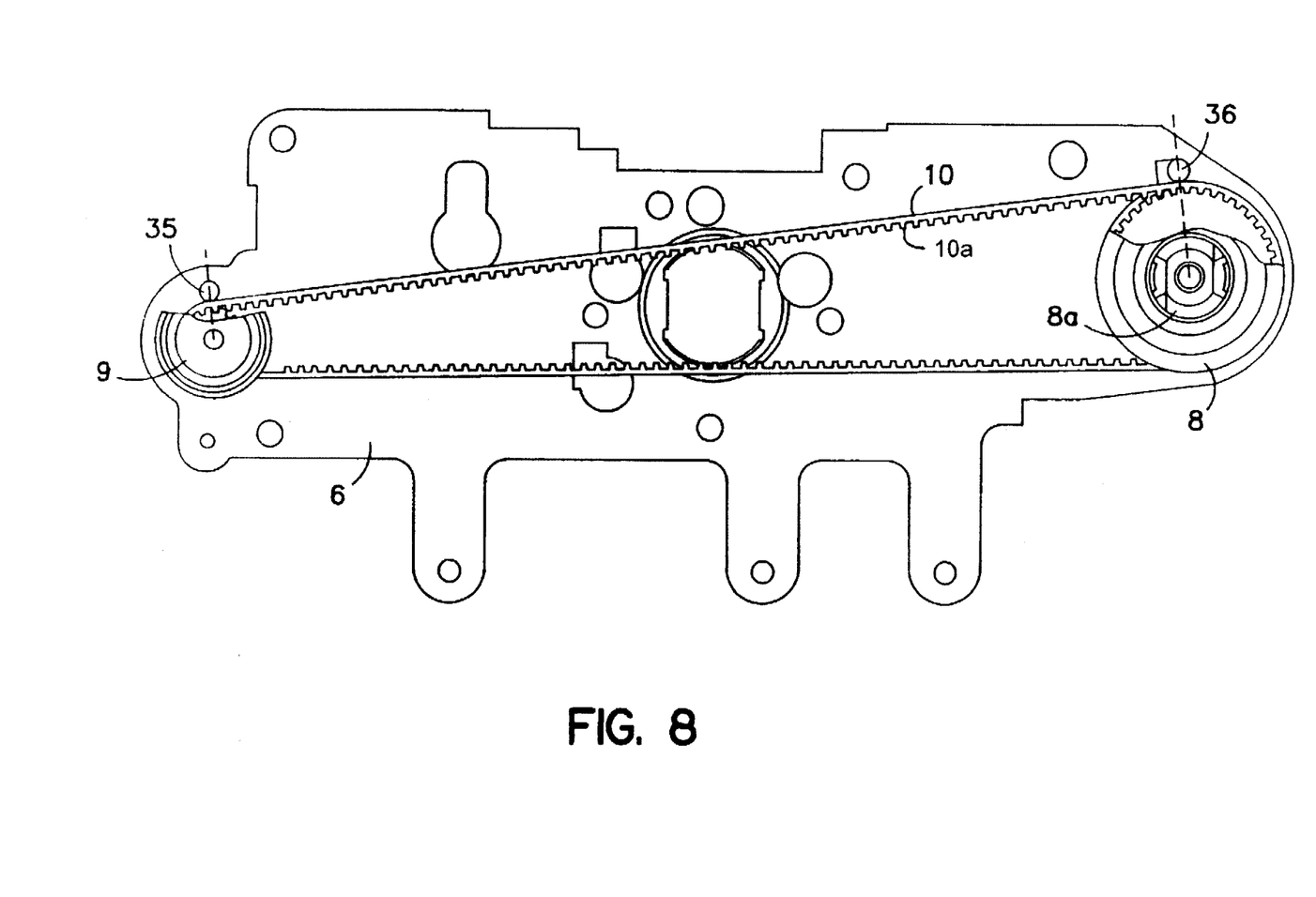
FIG. 8 is top view of a rewinding base plate for a camera according to a preferred embodiment of the present invention.

FIG. 2 is a perspective view illustrating a reduction gear drive unit 21 and a film feed drive mechanism 2 for a camera according to a preferred embodiment of the present invention. A rewinding mechanism and support section for film winding spool 3 are also illustrated for a camera according to this embodiment. FIG. 4 is a sectional diagram of a core of film winding spool 3 seen from the direction of arrow IV in FIG. 2. FIG. 4 also illustrates an area where reduction drive unit 21 is secured with screws through vibration and noise absorbers according to a preferred embodiment of the present invention. Moreover, FIG. 5 is a bottom view of camera body 1 to which vibration and noise absorbers are installed. FIG. 6 is a bottom view of FIG. 2 illustrating a state when the film is wound. FIG. 7 is a bottom view of FIG. 2 illustrating a state when the film is rewound. FIG. 8 is a top view of a rewinding mechanism attached to a base plate for a camera according to a preferred embodiment of the present invention.

Figure 3:
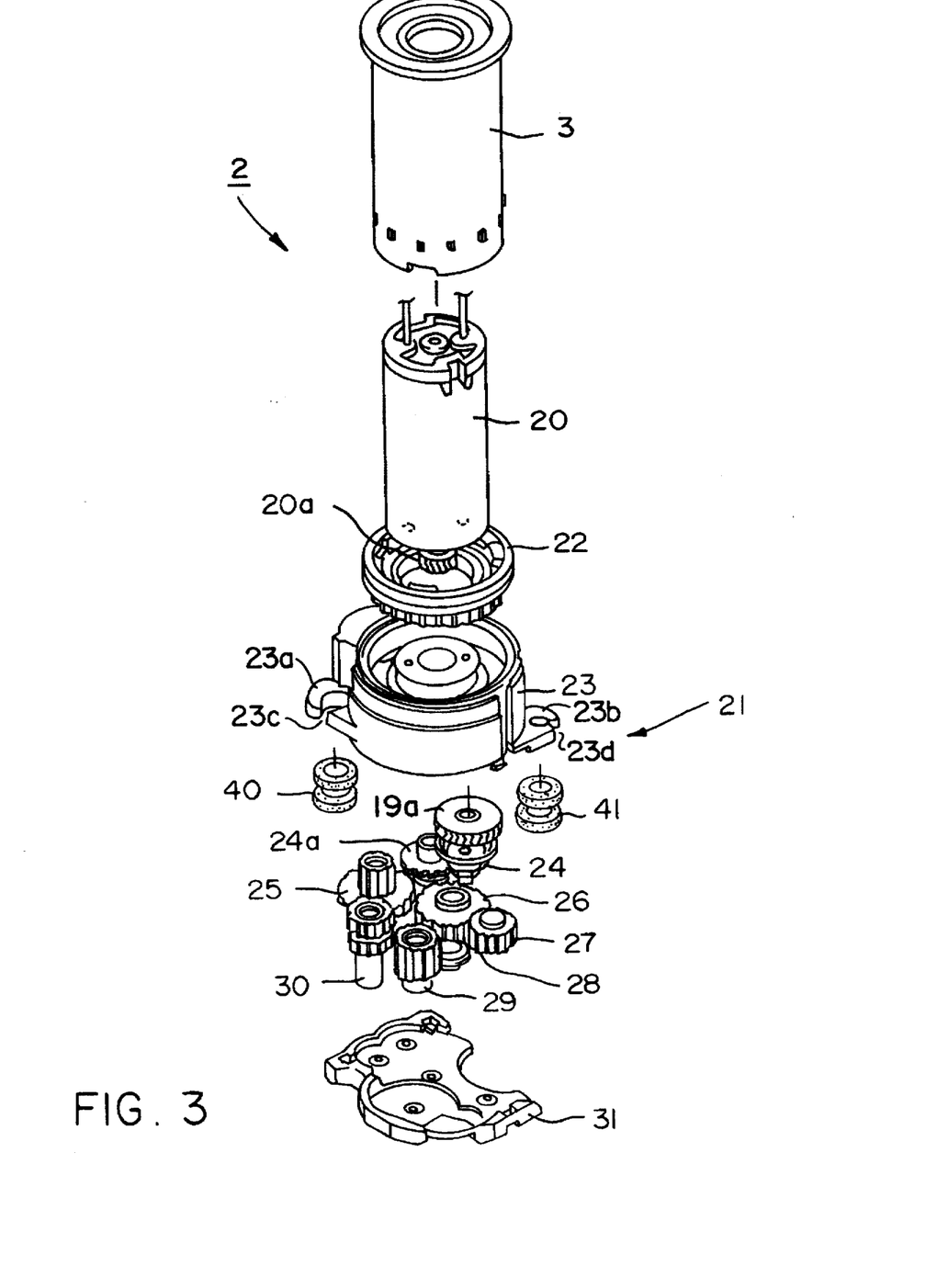
FIG. 3 is a schematic perspective view of a reduction gear from a motor in a camera according to a preferred embodiment of the present invention.

With reference now to FIG. 3, a configuration of reduction drive unit 21 having a reduction gear train is explained. Film drive motor 20 in FIG. 3 is secured with screws (not shown) to reduction base plate 23 while interposing with spool gear 22 that transmits rotational force to film winding spool 3. Gear 20a which is pressed onto a shaft of film drive motor 20, engages with gear 23a. A coil spring (which is a slipping mechanism not shown in FIG. 3) is inserted onto a shaft of gear 19a between gear 19a and gear 24. Gear 24 and the coil spring are then secured.

When a torque load that is greater than a specified value is applied to gear 19a, the coil spring and gear 19a begin to turn. Gear 24 stops the rotation. Gear 24 interlocks with dual gear 25 which has a different number of gear teeth via gear 19a, subsequently transmitting the rotational force to gear 26 at a reduced speed. Planetary gear 27 is coupled with gear 26 by way of arm 28 (see also FIGS. 4, 6 and 7) in a planetary state, thereby interlocking with gear 29 when spool 3 rotates in the winding direction.

Furthermore, the distance between the shafts of gear 27 and gear 29 is regulated. Bent section 28b (FIG. 4) which is located in the end of arm 28 touches the wall of reduction base plate 23 to thereby regulate the distance. Moreover, gear 29 interlocks with dual gear 30 and also with spool gear 22. Spool gear 22 interlocks with spool 3 in a direction of rotation. Additionally, gear 22 is supported onto the shaft of reduction base plate 23, while maintaining the aforementioned status, and secures reduction base plate holding plate 31 to reduction plate 23 with a snap fitting. Subsequently, the thrusting direction of each gear is controlled. In this case, screws may be used for fastening.

With this configuration, integration of the reduction gear mechanism which includes film drive motor 20 through spool 3 into reduction drive unit 21 is completed. Sound is prevented from escaping by surrounding the aforementioned high speed gears near film drive motor 20 (which is the source of the noise), with reduction base plate 23 and holding plate 31.

Next, a configuration in which reduction unit 21 is installed on camera body 1 is explained with reference to FIGS. 2, 3 and 5. First, a pair of cylindrical noise absorbers help to secure reduction drive unit 21 to camera body 1, and accordingly are hereinafter referred to as securing noise absorbers 40 and 41. Securing noise absorbers 40 and 41 fit into a pair of peripheral tabs 23a and 23b of reduction drive unit 21 by way of a pair of axial bores 23c and 23d. Another noise absorber supports reduction drive unit 21 with respect to camera body 1 by encircling rewinding spool 3, and is hereinafter referred to as supporting noise absorber 42. Supporting noise absorber 42 is placed between camera body 1 and reduction drive unit 21 as illustrated. Reduction drive unit 21 is then secured to camera body 1 with screws 38 and 39. Noise absorbers 40, 41 and 42 are also capable of absorbing vibration.

In order to determine the position of reduction drive unit 21, as well as to prevent reduction unit 21 (including film drive motor 20) from contacting camera body 1, securing noise absorbers 40 and 41 use vibration and noise absorbing materials which are hard due to a small area of contact with camera body 1. Securing noise absorbers 40 and 41 are far removed from spool 3 on reduction base plate 23. This causes difficulties in the control of vibration in spool 3 through securing noise absorbers 40 and 41 alone. Consequently, it becomes possible to control vibration of spool 3 by placing supporting noise absorber 42 about an external circumference of spool 3. Supporting noise absorber 42 also has a vibration absorbing capability.

Supporting noise absorber 42 is positioned in circumferential recess 44 of camera body 1 as illustrated in FIG. 5. Supporting noise absorber 42 has a larger area of contact than securing noise absorbers 40 and 41, so that vibration is easily transmitted and the contact load increases even if the hardness is the same. Also, supporting noise absorber 42 is positioned in an area where the vibration increases to a maximum due to proximity with film drive motor 20 and a high speed rotational section of reduction drive unit 21. It is therefore recommended that the hardness of supporting noise absorber 42 be less than that of securing noise absorbers 40 and 41. Noise absorber 42 also serves to prevent dust from entering and light from seeping into camera body 1. As evidenced in FIGS. 4 and 5, securing noise absorber 42 is juxtaposed between reduction drive unit 21 for film feeding, and circumferential bead 71 about film winding spool chamber 1a in camera body 1.

The film feed drive system of the preferred embodiment appropriately and reliably ensures vibration and noise proofing operation in a small area around a vibration source such as film winding spool 3, film drive motor 20, and reduction drive unit 21 by securing the drive unit, etc. onto camera body 1 by way of noise absorbers 40, 41, and 42. By doing so, and when attempting to accomplish vibration proofing by providing the film feed drive system with a floated support, the occurrence of vibration in the floated support section is minimized and an effective floating function is demonstrated. Thus, noise and vibration problems in the film feed drive system are prevented.

Additionally, the present preferred embodiment is configured in such a manner that supporting noise absorber 42 is placed between reduction drive unit 21 and circumferential recess 47 of camera body 1 into which film winding spool 3 is assembled. As illustrated in FIG. 5, supporting noise absorber 42 has a pair of opposed tabs 43 extending radially therefrom. Tabs 43 are received within indentations 45 in circumferential recess 44. The hardness of supporting noise absorber 42, which is used to support reduction base plate 23 on camera body 1 differs from that of securing noise absorbers 40 and 41 for securing reduction drive unit 21.

When securing the film feed drive system by way of noise absorbers 40, 41, and 42, transmission of vibration to camera body 1 can be effectively prevented. Thereby, oscillation of spool 3 can be controlled by simply providing supporting noise absorber 42 for supporting reduction drive unit 21 on camera body 1 and securing noise absorbers 40 and 41 having a different hardness therefrom.

A bearing (not shown) in the upper part of spool 3 includes raised base plate 11, the top of which is installed in an upper end of camera body 1. Raised base plate 11 is secured with screws along with shaft section 11a thereof. Furthermore, shaft section 11a of raised base plate 11 is, as evident in FIG. 4, positioned so that it is rotatable with spool 3. This section is far from the vibration source, thereby reducing the transmission of vibration. Raised base plate 11a is also secured with respect to camera body 1. A lower part of spool 3 fits with spool gear 22 by way of supporting purpose noise absorber 42. The vibration that occurs when spool 3 rotates is minimized through contact with shaft section 11a. This raised base plate 11 and spool gear 22 determine the direction of thrust of spool 3.

Additionally, for winding a camera film, reduction gear train 4 is explained with reference to FIGS. 2, 6, 7 and 8. Drive gear 9 is held on rewinding base plate 6 with a shaft so that it is rotatable. Drive gear 9 is a special dual gear in which ordinary gear 9a is combined with gear 9b having exterior teeth which mesh with internal teeth 10a of belt 10 (FIG. 8). Film rewinding fork 8a is fitted with rewinding pulley 8 that has external teeth meshing with internal teeth of belt 10 in a rotatable manner. A coil spring (not shown) is placed between pulley 8 and fork 8a. Assembled rewinding pulley 8 is held to rewinding base plate 6 with a shaft in a rotatable manner.

Furthermore, belt 10 is placed between pulley section gear 9b of drive gear 9 and pulley 8 such that pulley 8 rotates in correspondence with rotation of drive gear 9. Pins 35 and 36 are members which prevent the teeth in belt 10 from skipping. Pins 35 and 36 are located where belt 10 slackens and are installed by holding an exterior side of belt 10 at locations where belt 10 begins meshing with each of the pulleys, with respect to straight lines connecting belt 10 with pulley section gear 9b and pulley 8. This ensures that pins 35 and 36 do not make contact with belt 10. According to this embodiment, pins are used. However, molded products may be used as long as they contact belt 10 with an arc rather than a flat plane.

With respect to FIG. 4 depicting a sectional view of film winding spool 3, spring 37 is illustrated. Spring 37 supports gear 9 by energizing it unidirectionally so that it is movable in the direction of the shaft. In reference to FIG. 6, rewinding base plate 6 is positioned on camera body 1 and fastened thereto with screws. Ordinary gear 9a of drive gear 9 meshes with planetary gear 27. At this time, in the space between shafts of gear 27 and gear 9a, bent section 28a (FIG. 7) of arm 28 touches extended portion 6a of rewinding base plate 6, thereby regulating the space between shafts of the planetary gears. Subsequently, a space between the shafts is always maintained even if reduction drive unit 21 vibrates due to a rewinding operation of the film.

As illustrated, circumferential bead 71 extends inwardly within film winding spool chamber 1a from camera body 1. Circumferential bead 71 contacts with reduction drive unit 21 by way of supporting noise absorber 42 to thereby reduce noise and vibration.

The operation of each mechanism for winding and reminding is explained using FIGS. 2 through 8. First, for rewinding, the power supply required for winding a frame is provided by a CPU (not shown) that controls film feeding to activate rotation in a clockwise direction (CW). Gear 20a which has been inserted onto a shaft of film drive motor 20 also rotates, and the rotational force is gradually reduced to gear 19a. Planetary gear 27 has a planetary mechanism that transmits a driving force to gear 29 as shown in FIG. 6 thereby rotating film winding spool 3 in a forward direction.

Spool 3 (FIG. 2) has a plurality of notches 3a along a circumference thereof that correspond to perforations 61a of film 61 in order to catch the perforations. Film 61 is accordingly wound around an exterior circumference of spool 3. At this time, rewinding fork 8a is not engaged, thereby following a movement of film 61.

Next, for rewinding, a CPU (not shown) controls the film feeding and supplies power to film drive motor 20 so that it can rotate in a counter-clockwise direction, i.e. an opposite direction from that of the winding operation. A reduction process from the shaft of film drive motor 20 (FIG. 3) through planetary gear 27 is in the same direction as that of the winding operation. Planetary gear 27 transmits a driving force to gear 9 by a planetary mechanism as illustrated in FIG. 6. A driving force of gear 9 is then transmitted to pulley 8 via belt 10. Additionally, pulley 8 and fork 8a are combined in order to control rotation. Consequently, fork 8a engages a shaft of magazine 62 to transmit the driving force in a b-direction. At this time, spool 3 is not engaged, thus, following the movement of film 61.

Figure 9:
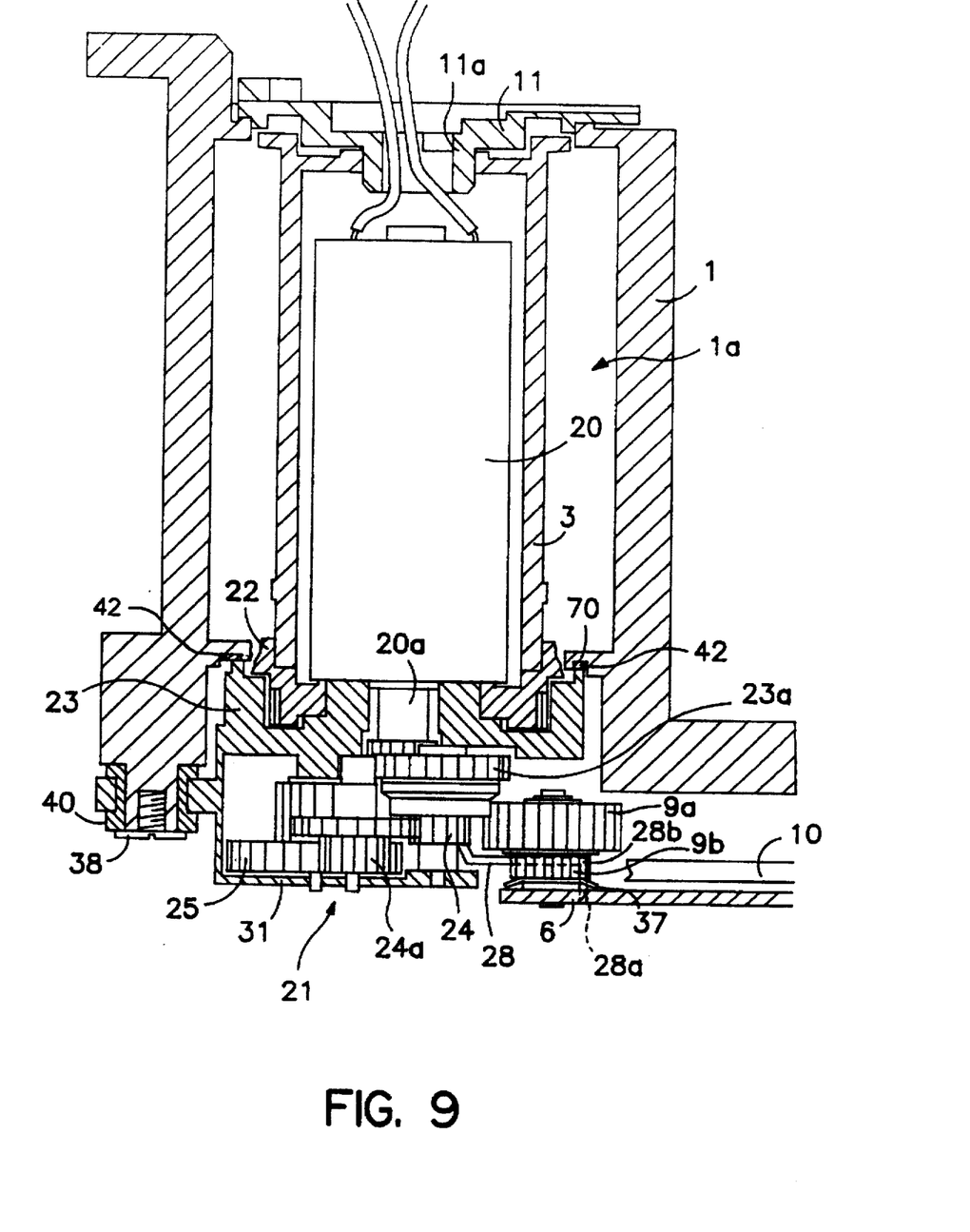
FIG. 9 is a sectional diagram of a film winding spool taken from the direction of arrow IV in FIG. 2 for a camera according to another embodiments of the present invention.
Figure 10:
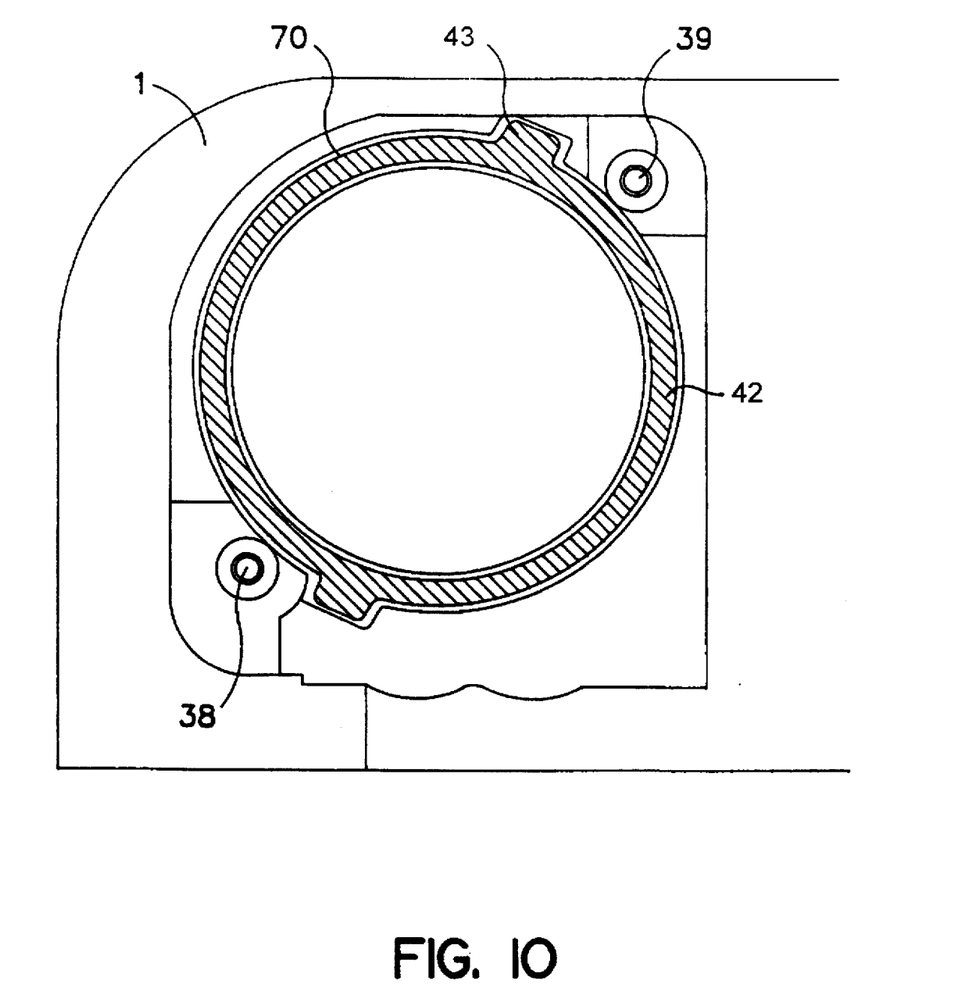
FIG. 10 is a bottom view of a camera body for a camera according to another embodiment of the present invention in which vibration and noise absorbers are installed.

FIGS. 9 and 10 are respectively a cross-sectional view of another preferred embodiment of the present invention and a bottom view of camera body 1 to which a vibration and noise absorber are installed. In this embodiment, supporting noise absorber 42 is fit into groove 70 on a side of camera body 1. Because of this, supporting noise absorber 42 is assembled inside an opening of camera body 1 without being dislodged. Stable rotation of spool 3 is thereby achieved.

The present invention is not limited to the structure of the above noted embodiments and it is inevitable that the configurations and structures of each part of a film feed drive system of a camera may be appropriately altered or modified for variations.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A camera comprising:
   a camera body defining an opening encircled by a circumferential bead;
   a base plate;
   a rotatable film winding spool, disposed within the camera body through the opening and rotatably connected to the base plate, said rotatable film winding spool for receiving and winding film;
   an electric motor disposed within the rotatable film winding spool and supported by said base plate, wherein the electric motor generates a driving force;
   a transmission gear train which transmits the driving force from the electric motor to the film winding spool and which is supported by said base plate;
   a first vibration and noise absorber, having a first hardness, disposed between the base plate and the camera body which absorbs vibration and noise produced by the electric motor; and
   a second vibration and noise absorber, having a second hardness less than the first hardness, disposed between the base plate and the circumferential bead of said camera body which absorbs vibration and noise produced by the electric motor.

2. The camera according to claim 1, wherein the first vibration and noise absorber supports the base plate.

3. A camera film feed drive system for reducing vibration and noise during winding and rewinding of photographic film in a camera, the photographic film having a plurality of perforations disposed along the sides thereof, said camera film feed drive system comprising:
   a camera body providing structural support to the camera;
   a film drive motor disposed within the camera body which provides a driving force to wind and rewind the photographic film;
   a film winding spool disposed within the camera body and housing the film drive motor, said film winding spool rotating in response to the driving force of the film drive motor and having a plurality of notches disposed about an outer periphery which receive a corresponding plurality of said perforations disposed along the sides of the photographic film;
   a reduction drive unit secured to the film drive motor and the camera body which transmits the driving force from the film drive motor to the film winding spool;
   a first noise absorber having a first hardness and physically connected to the reduction drive unit and the camera body, said first noise absorber reducing vibration and noise during winding and rewinding of the photographic film; and
   a second noise absorber having a second hardness less than said first hardness and physically connected to the reduction drive unit and the camera body, said second noise absorber reducing vibration and noise during winding and rewinding of the photographic film,
   wherein the camera body has a film winding spool chamber for receiving the film winding spool and a film magazine formation section for receiving a film magazine, and
   wherein said reduction drive unit includes:
      a plurality of rotating gears connected to the film drive motor and the film winding spool, and
      a reduction base plate connected to the camera body with said second noise absorber and connected to the film magazine formation section, said reduction base plate supporting the plurality of rotating gears.

4. The camera film feed drive system according to claim 3, wherein the plurality of rotating gears includes a first gear and the reduction base plate also supports a pulley gear, said camera film feed drive system further comprising:

a drive gear supported by the reduction base plate and having a first drive gear section for meshing with the first gear and the pulley gear; and an elongated member having a plurality of teeth disposed about an inner side which mesh with the pulley gear.

5. The camera film feed drive system according to claim 3, wherein the film winding spool chamber disposed within the camera body is an elongated chamber having a peripheral recess disposed at an end thereof, and the second noise absorber is configured and arranged to be received within the peripheral recess.

6. The camera film feed drive system according to claim 5, wherein the peripheral recess has a pair of indentations disposed about alternate sides thereof and the second noise absorber has a pair of tabs extending radially outward to be received within the indentations of the peripheral recess.

7. A camera film feed drive system for reducing vibration and noise during winding and rewinding of photographic film in a camera, the photographic film having a plurality of perforations disposed along the sides thereof, said camera film feed drive system comprising:

a camera body providing structural support to the camera;

a film drive motor disposed within the camera body which provides a driving force to wind and rewind the photographic film;

a film winding spool disposed within the camera body and housing the film drive motor, said film winding spool rotating in response to the driving force of the film drive motor and having a plurality of notches disposed about an outer periphery which receive a corresponding plurality of said perforations disposed along the sides of the photographic film;

a reduction drive unit secured to the film drive motor and the camera body which transmits the driving force from the film drive motor to the film winding spool;

a first noise absorber having a first hardness and physically connected to the reduction drive unit and the camera body, said first noise absorber reducing vibration and noise during winding and rewinding of the photographic film;

a second noise absorber having a second hardness less than said first hardness and physically connected to the reduction drive unit and the camera body, said second noise absorber reducing vibration and noise during winding and rewinding of the photographic film;

a plurality of threaded fasteners connected to the reduction drive unit and the camera body which thereby secure the film drive motor, wherein the reduction drive unit includes a plurality of cylindrical recesses disposed about an outer periphery which slidably receive the plurality of threaded fasteners; and a third noise absorber having a third hardness less than said first hardness and disposed between the reduction drive unit and the camera body, said third noise absorber reducing vibration and noise during winding and rewinding of the photographic film, wherein the second and third noise absorbers are disposed within two corresponding cylindrical recesses of the plurality of cylindrical recesses.

8. A camera film feed drive system for reducing vibration and noise during winding and rewinding of photographic film in a camera, the photographic film having a plurality of perforations disposed along the sides thereof, said camera film feed drive system comprising:

a camera body providing structural support to the camera;

a film drive motor disposed within the camera body which provides a driving force to wind and rewind the photographic film;

a film winding spool disposed within the camera body and housing the film drive motor, said film winding spool rotating in response to the driving force of the film drive motor and having a plurality of notches disposed about an outer periphery which receive a corresponding plurality of said perforations disposed along the sides of the photographic film;

a reduction drive unit secured to the film drive motor and the camera body which transmits the driving force from the film drive motor to the film winding spool through a transmission member, wherein the reduction drive unit includes a pair of peripheral tabs extending radially outward, each tab having a corresponding axial bore disposed therein;

a first noise absorber having a first hardness and physically connected to the reduction drive unit and the camera body, said first noise absorber reducing vibration and noise during winding and rewinding of the photographic film;

a second noise absorber having a second hardness less than the first hardness and physically connected to the reduction drive unit and the camera body, said second noise absorber reducing vibration and noise during winding and rewinding of the photographic film;

a third noise absorber having a third hardness less than the first hardness and disposed between said reduction drive unit and the camera body, said third noise absorber reducing vibration and noise during winding and rewinding of the photographic film; and a pair of threaded fasteners connected to the reduction drive unit through the pair of axial bores and connected to the camera body for securing the film drive motor, wherein said second and third noise absorbers are disposed within the axial bores and receive a respective threaded fastener from said pair of threaded fasteners.

9. The camera film feed drive system according to claim 8, wherein each of the first and second noise absorbers is a cylinder having a top end and a bottom end, and wherein each noise absorber includes a top end peripheral bead disposed on the top end and a bottom end peripheral bead disposed on the bottom end.

10. The camera film feed drive system according to claim 9, wherein each of the second and third noise absorbers are respectively disposed within the pair of corresponding axial bores such that each top end peripheral bead protrudes above a corresponding peripheral tab and each bottom end peripheral bead protrudes below each corresponding peripheral tab.

11. A camera film feed drive system for reducing vibration and noise during winding and rewinding of photographic film in a camera, the photographic film having a plurality of perforations disposed along the sides thereof, said camera film feed drive system comprising:

a camera body providing structural support to the camera, wherein the camera body has a film winding spool chamber for receiving the film winding spool and a film magazine formation section for receiving a film magazine;

a film drive motor disposed within the camera body which provides a driving force to wind and rewind the photographic film;

a film winding spool disposed within the camera body and housing the film drive motor, said film winding spool rotating in response to the driving force of the film drive motor and having a plurality of notches disposed about an outer periphery which receive a corresponding plurality of the perforations disposed along the sides of the photographic film;

a reduction drive unit secured to said film drive motor and the camera body which transmits the driving force from said film drive motor to said film winding spool through a transmission member;

a first noise absorber having a first hardness and physically connected to said reduction drive unit and the camera body, said first noise absorber reducing vibration and noise during winding and rewinding of the photographic film;

a second noise absorber having a second hardness less than said first hardness and physically connected to said reduction drive unit and the camera body, said second noise absorber reducing vibration and noise during winding and rewinding of the photographic film; and a circumferential bead extending inwardly within the film winding spool chamber for mating with said reduction drive unit, wherein said first noise absorber is disposed between said circumferential bead and said reduction drive unit.

12. A camera comprising:

a body;

a spool disposed within said body for winding film;

a motor disposed within said spool;

a drive unit which supports said spool and said motor, and which transmits force from said motor to said spool;

a first vibration absorber, having a first hardness, disposed between said drive unit and said body;

a second vibration absorber, having a second hardness less than the first hardness, disposed between said drive unit and said body; and a third vibration absorber, having a third hardness less than said first hardness, disposed between said drive unit and said body.

13. A camera comprising:

a camera body defining an opening encircled by a circumferential plate;

a base plate;

a rotatable film winding spool, disposed within the camera body through the opening and rotatably connected to the base plate, said rotatable film winding spool for receiving and winding film;

an electric motor disposed within the rotatable film winding spool and supported by said base plate, wherein the electric motor generates a driving force;

a transmission gear train which transmits the driving force from the electric motor to the film winding spool and which is supported by said base plate;

a first vibration and noise absorber, having a first hardness, disposed between the base plate and the camera body which absorbs vibration and noise produced by the electric motor; and a second vibration and noise absorber, having a second hardness less than the first hardness, disposed between the base plate and the circumferential plate of said camera body which absorbs vibration and noise produced by the electric motor.

14. A camera comprising:

a camera body;

a base plate;

a winding spool rotatably connected to the base plate to wind camera film;

an electric motor disposed within the winding spool and supported by said base plate to generate a driving force;

a transmission gear train to transmit the driving force from the electric motor to the winding spool;

a first vibration and noise absorber, having a first hardness, connecting the base plate directly to the camera body to absorb vibration and noise produced by the electric motor; and a second vibration and noise absorber, having a second hardness less than the first hardness, connecting the base plate directly to the camera body to absorb vibration and noise produced by the electric motor.

15. A camera film feed drive system for reducing vibration and noise comprising:

a camera body;

a film drive motor disposed within the camera which provides a driving force to wind and rewind photographic film;

a film winding spool to house the film drive motor, said film winding spool rotating in response to the driving force of the film drive motor and having a plurality of notches disposed about an outer periphery which receive a corresponding plurality of perforations in photographic film;

a reduction drive unit secured to the film drive motor and the camera body to transmit the driving force from the film drive motor to the film winding spool;

a first noise absorber having a first hardness and connecting the reduction drive unit directly to the camera body, said first noise absorber to reduce vibration and noise during winding and rewinding of the photographic film; and a second noise absorber having a second hardness less than said first hardness and connecting the reduction drive unit directly to the camera body, said second noise absorber to reduce vibration and noise during winding and rewinding of the photographic film.

16. A camera film feed drive system for reducing vibration and noise comprising:

a camera body;

a film winding spool having a plurality of notches disposed about an outer periphery to receive a corresponding plurality of perforations in photographic film;

a film drive motor disposed within the film winding spool to provide a driving force which rotates said film winding spool;

a reduction drive unit to transfer the driving force from the film drive motor to the film winding spool, said reduction drive unit being attached to the camera body with a plurality of radially extending tabs;

a first vibration and noise absorber having a first hardness and connecting the reduction drive unit directly to the camera body, said first vibration and noise absorber absorbing vibration and noise produced by said film drive motor; and a second vibration and noise absorber having a second hardness less than said first hardness and connecting the reduction drive unit directly to the camera body, said second vibration and noise absorber absorbing vibration and noise produced by the film drive motor.

17. The camera film feed drive system according to claim 16, further comprising:

a third vibration and noise absorber having a third hardness less than said first hardness and connecting the reduction drive unit directly to the camera body, said third vibration and noise absorber being substantially similar to said second vibration and noise absorber;

wherein each of the second and third vibration and noise absorbers is a cylinder having a top end and a bottom end, and includes a laterally extending top end and a laterally extending bottom end.

18. A camera film feed drive system for reducing vibration and noise during winding and rewinding of photographic film, the film having a plurality of perforations disposed along the sides thereof, said camera film feed drive system comprising:

a camera body providing structural support to the camera;

a film winding spool having a plurality of notches disposed about an outer periphery for receiving a corresponding plurality of said perforations in the photographic film;

a film drive motor disposed within the film winding spool and providing a driving force which rotates said film winding spool;

a reduction drive unit which transfers the driving force from the film drive motor to the film winding spool, said reduction drive unit being attached to the camera body with a plurality of radially extending tabs;

a first vibration and noise absorber having a first hardness and disposed between the reduction drive unit and the camera body, said first vibration and noise absorber absorbing vibration and noise produced by the film drive motor; and a second vibration and noise absorber having a second hardness less than said first hardness and disposed between the reduction drive unit and the camera body, said second vibration and noise absorber absorbing vibration and noise produced by the film drive motor.

19. The camera film feed drive system according to claim 18, wherein the camera body has a film winding spool chamber for receiving the film winding spool and a film magazine formation section for receiving a film magazine, said film feed drive system further comprising:

a plurality of rotatable gears connected to the film drive motor and supported by the reduction drive unit; and a rewinding base plate connected to the camera body between the film winding spool chamber and the film magazine formation section and supporting the plurality of rotatable gears.

20. The camera film feed drive system according to claim 19, wherein the plurality of rotating gears includes a first gear, said camera film feed drive system further comprising:

a drive gear, supported by the rewinding base plate, having a first drive gear section for meshing with said first gear and a pulley section gear; and an elongated member having a plurality of teeth disposed about an inner side for meshing with the drive gear and the pulley section gear.

21. The camera film feed drive system according to claim 18, further comprising:

a third vibration and noise absorber having a third hardness less than said first hardness and disposed between the reduction drive unit and the camera body, said third vibration and noise absorber being substantially similar to said second vibration and noise absorber;

wherein each of the second and third vibration and noise absorbers is a cylinder having a top end and a bottom end, and wherein each of the second and third vibration noise absorbers includes a top end peripheral bead disposed on the top end and a bottom end peripheral bead disposed on the bottom end.

* * * * *